United States Patent [19]

Wooler

[11] 4,234,693

[45] Nov. 18, 1980

[54] PROCESS FOR MAKING POLYUREA FOAMS UTILIZING IMIDAZOLE CATALYSTS

[75] Inventor: Alan M. Wooler, Manchester, England

[73] Assignee: Imperial Chemical Industries Limited, London, England

[21] Appl. No.: 695,413

[22] Filed: Jun. 14, 1976

[30] Foreign Application Priority Data

Jun. 24, 1975 [GB] United Kingdom ............... 26746/75

[51] Int. Cl.$^3$ ...................... C08G 18/14; C08G 18/20; C08G 18/76
[52] U.S. Cl. .................................. 521/107; 521/128; 521/129; 521/160; 521/906; 521/174
[58] Field of Search ................... 260/2.5 AC, 2.5 AT, 260/2.5 AJ, 2.5 AL; 521/107, 128, 129, 160

[56] References Cited

U.S. PATENT DOCUMENTS

| | | | |
|---|---|---|---|
| 2,726,219 | 12/1955 | Hill, Jr. | 260/2.5 AP |
| 2,977,330 | 3/1961 | Brower | 260/2.5 AD |
| 3,041,293 | 6/1962 | Polacek | 260/2.5 AL |
| 3,152,094 | 10/1964 | Erner et al. | 260/2.5 AC |
| 3,177,223 | 4/1965 | Erner | 260/2.5 AC |
| 3,793,241 | 2/1974 | Kyle et al. | 260/2.5 AD |
| 3,805,532 | 4/1974 | Kistner | 260/2.5 AD |
| 3,912,689 | 10/1975 | Bechara et al. | 260/2.5 AC |
| 3,959,191 | 5/1976 | Kehr et al. | 260/2.5 AC |
| 3,985,688 | 10/1976 | Speech | 260/2.5 AD |

FOREIGN PATENT DOCUMENTS

| | | | |
|---|---|---|---|
| 918868 | 2/1963 | United Kingdom | 260/2.5 AJ |
| 1159435 | 7/1969 | United Kingdom | 260/2.5 AJ |

*Primary Examiner*—H. S. Cockeram
*Attorney, Agent, or Firm*—Cushman, Darby & Cushman

[57] ABSTRACT

A process for the manufacture of polyurea foams which comprises reacting an organic polyisocyanate with at least a chemically equivalent amount of water in the presence of an imidazole compound.

8 Claims, No Drawings

PROCESS FOR MAKING POLYUREA FOAMS UTILIZING IMIDAZOLE CATALYSTS

This invention relates to polymeric materials and more particularly to polymeric foams having a polyurea structure.

It has already been proposed to manufacture rigid foams having a polyurea structure by reacting an organic polyisocyanate with water in the presence of catalysts and optionally other additives such as surface active agents. The results have not been entirely satisfactory because of operating difficulties which in turn have affected the quality of the products.

It has now been found that easier processing and superior products are obtained by employing imidazole compounds as catalysts.

Thus, according to the present invention, there is provided a process for the manufacture of polyurea foams which comprises reacting an organic polyisocyanate with at least a chemically equivalent amount of water in the presence of an imidazole compound.

Organic polyisocyanates which may be used in the process of the invention include particularly those aromatic polyisocyanates that have already been described for use in the manufacture of polymeric foams such as polyurethane, polyurea or polyisocyanurate foams. Particular mention may be made of diphenylmethane diisocyanate and tolylene diisocyanate in their various forms. It is preferred to use a polyisocyanate component comprising diphenylmethane diisocyanate, especially diphenylmethane-4,4'-diisocyanate which may be in admixture with isomeric or other related polyisocyanates or may have been modified in known manner to introduce a significant isocyanurate, carbodiimide, uretonimine or biuret content. Polyisocyanate components comprising diphenylmethane diisocyanate include the crude diphenylmethane diisocyanates that have been fully described in the prior art. Particularly useful crude diphenylmethane diisocyanate compositions contain from 30 to 95%, especially from 40 to 80%, by weight of diphenylmethane diisocyanates, the remainder being largely polymethylene polyphenyl polyisocyanates of functionality greater than two. Diphenylmethane diisocyanate, in one of its forms, may also be used in admixture with tolylene diisocyanate.

The water used in the process of the invention must be in an amount that is at least chemically equivalent to the isocyanate groups present in the organic polyisocyanate. Useful results can be obtained by using up to 10 times the amount of water that is equivalent to the polyisocyanate but it is preferred to use from 1.5 to 5 and especially from 2 to 4 times the chemically equivalent amount.

Imidazole compounds which may be used in the process of the invention include compounds of the formuls:

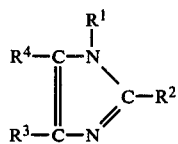

wherein $R^1$, $R^2$, $R^3$ and $R^4$ each independently represents hydrogen or optionally substituted alkyl, especially lower alkyl. Examples of such compounds include imidazole, 1-methylimidazole, 2-methylimidazole, 4-methylimidazole, 1,2-dimethylimidazole, 2,4-dimethylimidazole, 1,2,4-trimethylimidazole, 1,2,5-trimethylimidazole, 2,4,5-trimethylimidazole and 1,2,4,5-tetramethylimidazole. Imidazole compounds that have been found to be particularly useful in the process of the invention include imidazole, 1-methylimidazole, 2-methylimidazole and 1,2-dimethylimidazole and mixtures of two or more of these compounds. The imidazole compound is used in a catalytically effective amount, for example from 0.5 to 10%, especially 1.5 to 8%, by weight based on the weight of organic polyisocyanate. The most suitable amount to use in any particular case depends on the imidazole compound being used and on the other components of the formulation and can easily be found by trial.

Many of the imidazole compounds are sufficiently soluble in water to be used in the form of a solution in the water that is reacted with the polyisocyanate. The occurrence of crystallisation from the aqueous solution at low temperatures can often be avoided by using mixtures of imidazole compounds. The alkalinity of the aqueous solutions can cause corrosion of equipment containing aluminium or zinc but this can be reduced by saturating the catalyst solution with carbon dioxide. Imidazole compounds having lower aqueous solubility may be dissolved in another component, for example the polyisocyanate or a tris(halogenoalkyl)phosphate.

The imidazole compounds give exceptional stability to the foams during formation and in this respect they are much superior to the more conventional types of catalysts, such as tertiary amines and tin compounds, that have been proposed for use in the preparation of polymeric foams from polyisocyanates. Thus, the problems of foam collapse and excessive shrinkage which can occur in the preparation of polyurea foams using those conventional catalysts are largely overcome by using the imidazole compounds. Furthermore, the imidazole compounds are more tolerant to the presence or absence of other conventional foam additives.

The foams made by the process of the invention are substantially rigid, have predominantly open cells and are of very low flammability. A tendency to brittleness can be reduced by including a plasticiser in the foam formulation, especially a tris(halogenoalkyl)phosphate such as tris-2-chloroethyl phosphate, tris chloropropyl phosphate or tris-2,3-dibromopropyl phosphate. In addition to having a useful plasticising effect, these compounds bring about a further improvement in the fire resistance of the foams. Particularly useful amounts of tris(halogenoalkyl)phosphate are in the range of from 10 to 200% and especially from 25 to 75% by weight based on the weight of polyisocyanate.

In addition to the ingredients already mentioned, there may be included in the foam-forming reaction mixture other additives of the types conventionally employed in the production of polymeric foams from organic polyisocyanates. Thus, the reaction mixture may optionally contain surface active agents or foam stabilisers, for example siloxane-oxyalkylene copolymers and non-ionic surface active agents such as ethylene oxide propylene oxide block copolymers. The latter type of agent may be used in amounts of from 0.01 to 5% by weight based on the weight of polyisocyanate but is especially effective in amounts of from 0.1 to 0.5%.

The stability of the foam-forming system may be still further improved by including a minor amount of an organic polyol in the foam formulation, keeping the water in an amount that is at least chemically equivalent to the polyisocyanate. Suitable organic polyols include non-polymeric polyols, for example ethylene glycol, diethylene glycol, 1,4-butane diol, glycerol, hexanetriol and sorbitol.

Other suitable polyols include polymeric polyols which are useful in reducing the friability of the foams. Such polyols usually have from 2 to 8 hydroxyl groups per molecule and include, in particular, polyether and polyester polyols. These have been widely described in the prior art, for example in "Polyurethanes, Chemistry and Technology" by J. H. Saunders and K. C. Frisch (Interscience Publishers), especially at pages 32–48 of Part I. Useful polyether polyols include polyoxypropylene polyols and ethylene oxide tipped polyoxypropylene polyols. Useful polyester polyols include the reaction products of dihydric alcohols with dicarboxylic acids, optionally with the inclusion of higher functionality reactants. The polymeric polyols may also be used in a form where they have been modified in known manner by polymerising one or more ethylenically unsaturated monomers, for example acrylonitrile, styrene or methyl methacrylate therein. Particularly suitable polymeric polyols have hydroxyl numbers of less than 300, preferably in the range 100–200. The amount of organic polyol used should preferably not exceed 30% of the polyisocyanate on a chemical equivalents basis. The polyol may be included in a one-shot formulation by reacting it with the polyisocyanate together with the water.

Other materials which may be incorporated in the foam-forming reaction mixture include agents capable of thickening the aqueous component to facilitate pumping. Such agents include the natural gums and polymeric materials that have been used as thickeners in textile printing pastes. Polyacrylamide is especially suitable.

Other additives which may be incorporated in the reaction mixture include dyes, pigments, fillers and inorganic flame retardants such as ammonium phosphate, ammonium polyphosphate and ammonium bromide.

Apart from the materials hereinbefore mentioned, it is preferred to use foam-forming reaction mixtures which contain no other reactive or catalytic materials, that is to say materials having a reactive or catalytic effect in the foam-forming reaction.

Particularly useful reaction mixtures consist essentially of a crude diphenylmethane diisocyanate composition containing from 40 to 80% by weight of diphenylmethane diisocyanates, from 1.5 to 5 times the chemically equivalent amount of water, from 1.5 to 8% by weight of an imidazole compound, from 25 to 75% by weight of a tris(halogenoalkyl) phosphate and from 0.1 to 0.5% by weight of a non-ionic surface active agent, the weight percentages being based on the weight of the diisocyanate composition, and optionally other conventional foam-forming ingredients of an inert nature.

The foam-forming ingredients used in the process of the invention may be mixed together continuously or discontinuously using any of the methods and equipment that have been described for the preparation of polymeric foams from organic polyisocyanates. The starting materials may be at normal or slightly elevated temperatures, for example 50° C.

The foams obtained according to the process of the invention may have low or high densities and may be used in packaging, horticultural applications, cavity wall insulation, panel filling etc. The usefulness of the foam for any particular application may be influenced by varying the formulation. Thus, for example, the inclusion of a polymeric polyol reduces the friability of the foams and increases the stability but reduces the fire resistance. Polyol-containing formulations are therefore useful in cavity wall insulation where the cold, damp, rough, thin-section cavities impose great stresses on the rising foam and where the danger of fire is low. The foams may be formed in combination with other materials, for example flexible or rigid facing materials, using known methods, for example continuous lamination techniques.

The invention is illustrated but not limited by the following Examples in which all parts are by weight.

EXAMPLE 1

100 parts of a crude diphenylmethane diisocyanate containing approximately 55% of diisocyanatodiphenylmethane isomers and having an NCO content of 29.2% are mixed with 45 parts of tris-2-chloroethyl phosphate. A solution of 6 parts of imidazole in 20 parts of water is added and mixed in. The cream time is 12 seconds, the foam rises completely in 60 seconds and the product is an open-celled, scorch-free foam having a satisfactory texture and a density of 7–8 kg/m$^3$. The amount of water used is approximately 3.2 equivalents per equivalent of isocyanate.

A similar result is obtained when the 6 parts of imidazole are replaced by 4 parts of 2-methylimidazole or 2 parts of 1,2-dimethylimidazole.

The texture of the foam is improved by including in the formulation 0.5 part of an oxyethylated polypropylene glycol having a molecular weight of 2000 and an oxyethylene content of 10%.

EXAMPLE 2

100 Parts of the crude diphenylmethane diisocyanate described in Example 1 are mixed with 30 parts of oxypropylated glycerol (molecular weight 1000) and a solution of 2 parts of 1,2-dimethylimidazole in 20 parts of water. The product is a low density, open-celled foam. Similar results are obtained when the 1,2-dimethylimidazole is replaced by 4 parts of 2-methylimidazole or 6 parts of imidazole.

EXAMPLE 3

100 Parts of the crude diphenylmethane diisocyanate described in Example 1 are mixed with a solution of 4 parts of 2-methylimidazole in 15 parts of water. This simple formulation gives a cream time of 8 seconds and a rise time of 70 seconds and the resulting foam has good texture and a density of 7 kg/m$^3$. The amount of water used is approximately 2.4 equivalents per equivalent of isocyanate.

EXAMPLE 4

100 Parts of the crude diphenylmethane diisocyanate described in Example 1 are mixed with 45 parts of tris-2-chloroethyl phosphate. A solution is prepared containing 4 parts of 2-methylimidazole, 15 parts of water and 0.25 part of the oxyethylated polypropylene glycol mentioned in Example 1. The two components are mixed giving a foam having a density of 8.2 kg/m$^3$.

When 45 parts of tris-chloropropyl phosphate are used in place of the 45 parts of tris-chloroethyl phosphate, a foam is obtained having a density of 9.0 kg/m$^3$.

EXAMPLE 5

Using the same two component mixing technique as in Example 4, a series of foams is prepared with various concentrations of tris-2-chloroethyl phosphate.

| | | | | | |
|---|---|---|---|---|---|
| Crude MDI (as in Example 1) | 100 | 100 | 100 | 100 | 100 |
| Tris-chloroethyl phosphate | 45 | 75 | 100 | 150 | 200 |
| Water | 15 | 15 | 15 | 15 | 15 |
| 2-methylimidazole | 4 | 4 | 4 | 8 | 8 |
| Oxyethylated polypropylene glycol (as Ex.1) | 0.25 | 0.25 | 0.25 | 0.25 | 0.25 |
| Cream time (s) | 11 | 12 | 15 | 7 | 10 |
| Rise Time (s) | 75 | 80 | 90 | 70 | 95 |
| Density (kg/m$^3$) | 7.8 | 11.0 | 14.0 | 16.8 | 21.1 |

EXAMPLE 6

A mixture of 100 parts of the crude diphenylmethane diisocyanate described in Example 1 and 45 parts of tris-2-chloroethyl phosphate is designated Component A. A solution of 4 parts of 2-methylimidazole and 0.25 part of the oxyethylated polypropylene glycol described in Example 1 in 15 parts of water is designated Component B. Foams are made by mixing Components A and B in various proportions.

| | | | | | | |
|---|---|---|---|---|---|---|
| Ratio A/B | | 10:1 | 7.5:1 | 6.3:1 | 5:1 | 3.7:1 |
| Cream time (s) | | 17 | 15 | 10 | 8 | 6 |
| Rise time (s) | | 100 | 76 | 55 | 38 | 30 |
| Foam density (kg/m$^3$) | | 9.5 | 7.8 | 7.1 | 7.4 | 8.0 |
| Compression strength | Parallel to direction | — | 17 | 16 | 14 | 11 |
| Compression modulus | of rise | — | 450 | 490 | 450 | 430 |
| Compression strength | Perpendicular to direction | — | 5.2 | 4.0 | 3.3 | 3.0 |
| Compression modulus | of rise | — | 83 | 75 | 65 | 60 |
| Equivalents of water per equivalent of isocyanate | | 1.8 | 2.4 | 2.8 | 3.6 | 4.8 |

EXAMPLE 7

The foam preparation described in Example 6 using 7.5 parts of Component A to 1 part of Component B is reported with the two Components at 50° C. instead of room temperature. At the higher temperature, the cream time is 3 seconds, the rise time is 32 seconds and the foam density is 6.7 kg/m$^3$.

EXAMPLE 8

A mixture of 100 parts of the crude diphenylmethane diisocyanate described in Example 1 and 45 parts of tris-2-chloroethyl phosphate is prepared. Foam preparations are carried out by combining this mixture with a mixture of 15 parts of water and a catalyst. Various catalysts are used in the amounts indicated below.

| Catalyst | Amount | Result |
|---|---|---|
| 2-methylimidazole | 4 | good foam 7.6 kg/m$^3$ |
| 1-methylimidazole | 2 | good foam 8.1 kg/m$^3$ |
| 1,2-dimethylimidazole | 2 | good foam 8.0 kg/m$^3$ |
| dibutyltin dilaurate | 2 | collapse |
| dibutyltin dilaurate | 4 | collapse |
| dimethyldodecylamine | 4 | collapse |
| dimethylcyclohexylamine | 2 | collapse |
| dimethylbenzylamine | 3 | collapse |
| triethylamine | 1.5 | collapse |
| triethylamine | 2 | poor foam |
| triethylamine | 20 | collapse |
| triethylene diamine | 4 | semi-collapse |
| triethylene diamine | 6 | semi-collapse |
| N-methylmorpholine | 4 | collapse |
| lead octoate | 2 | collapse |
| tris(dimethylaminopropyl)hexahydro-s-triazine | 2 | collapse |
| 2,4,6-tris(dimethylaminomethyl)phenol | 4 | collapse |

EXAMPLE 9

A mixture of 100 parts of the crude diphenylmethane diisocyanate described in Example 1 and 45 parts of tris-2-chloroethyl phosphate is combined with a solution of 2 parts of 2-methylimidazole, 1 part of 1,2-dimethylimidazole and 0.25 part of oxyethylated polypropylene glycol (described in Example 1) in 15 parts of water. An open-celled low density foam is obtained.

The catalyst solution used in this Example crystallises at a lower temperature than that used in Examples 4–7.

EXAMPLE 10

The procedure of Example 9 is repeated using a catalyst solution consisting of 2 parts of 2-methylimidazole, 1 part of 1-methylimidazole and 0.25 part of oxyethylated polypropylene glycol (described in Example 1) in 15 parts of water. An open-celled low density foam is obtained.

The catalyst solution used in this Example crystallises at a lower temperature than that used in Examples 4–7.

EXAMPLE 11

100 Parts of the crude diphenylmethane diisocyanate described in Example 1 are mixed with 50 parts of tris-2-chloroethyl phosphate. A solution is prepared containing 4 parts of 2-methylimidazole and 0.25 part of oxyethylated polypropylene glycol (described in Example 1) in 30 parts of water and carbon dioxide is passed in until the pH is 9. The two components are combined giving a cream time of 15 seconds, a rise time of 80 seconds and a foam of good texture having a density of 5.7 kg/m$^3$. The amount of water used is approximately 4.8 equivalents per equivalent of isocyanate.

I claim:

1. A process for the manufacture of polyurea foams which comprises reacting an organic polyisocyanate with from 1 to 10 times the chemically equivalent amount of water in the presence of from 0.5 to 10% by weight, based on the weight of organic polyisocyanate, of an imidazole compound of the formula:

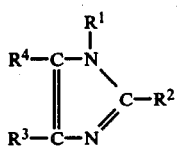

wherein $R^1$, $R^2$, $R^3$ and $R^4$ each independently represents hydrogen or lower alkyl.

2. A process as claimed in claim 1 wherein the organic polyisocyanate is a crude diphenylmethane diisocyanate containing from 30 to 95% by weight of diphenylmethane diisocyanates, the remainder being largely polymethylene polyphenyl polyisocyanates of functionality greater than two.

3. A process as claimed in claim 1 wherein the amount of water is from 1.5 to 5 times the chemically equivalent amount.

4. A process as claimed in claim 1 wherein the imidazole compound is imidazole, 1-methylimidazole, 2-methylimidazole or 1,2-dimethylimidazole.

5. A process as claimed in claim 1 wherein the reaction is performed in the presence of from 10 to 200% by weight of a tris(halogenoalkyl)phosphate, based on the weight of organic polyisocyanate.

6. A process as claimed in claim 1 wherein the reaction is performed in the presence of from 0.01 to 5% by weight of a non-ionic surface active agent, based on the weight of organic polyisocyanate.

7. A process as claimed in claim 1 wherein the reaction is performed in the presence of a polymeric polyol having a hydroxyl number less than 300, the amount of polyol not exceeding 30% of the polyisocyanate on a chemical equivalents basis.

8. A process as claimed in claim 1 which comprises forming a reaction mixture consisting essentially of a crude diphenylmethane diisocyanate composition containing from 40 to 80% by weight of diphenylmethane diisocyanates, from 1.5 to 5 times the amount of water that is chemically equivalent thereto, from 1.5 to 8% of the imidazole compound, from 25 to 75% by weight of a tris(halogenoalkyl)phosphate and from 0.1 to 0.5% by weight of a non-ionic surface active agent, optionally with other conventional foam-forming ingredients of an inert nature, the weight percentages being based on the weight of the crude diisocyanate composition.

* * * * *